United States Patent
Hardtke et al.

(10) Patent No.: US 7,021,855 B2
(45) Date of Patent: Apr. 4, 2006

(54) CLAMPING DEVICE FOR CLAMPING GIRDERS

(75) Inventors: Hans-Herlof Hardtke, Zeven (DE); Jorg Bernert, Zeven-Hofkoh (DE)

(73) Assignee: Lisega GmbH, Zeven (DE)

(*) Notice: Subject to any disclaimer, the term of this patent is extended or adjusted under 35 U.S.C. 154(b) by 0 days.

(21) Appl. No.: 10/121,553

(22) Filed: Apr. 12, 2002

(65) Prior Publication Data

US 2002/0182003 A1    Dec. 5, 2002

(30) Foreign Application Priority Data

Apr. 12, 2001 (DE) ............... 101 18 714
Aug. 9, 2001 (DE) ............... 101 39 226

(51) Int. Cl.
*F16B 2/02* (2006.01)
*E04G 7/08* (2006.01)

(52) U.S. Cl. ............... 403/168; 403/256; 403/388; 403/DIG. 9

(58) Field of Classification Search ............... 403/168, 403/230, 247, 257, 259, 260, 373, 374.3, 403/387, 388, DIG. 9, 256
See application file for complete search history.

(56) References Cited

U.S. PATENT DOCUMENTS

| | | | | |
|---|---|---|---|---|
| 928,827 A | * | 7/1909 | Whitaker | 238/79 |
| 1,925,867 A | * | 9/1933 | Dunlop | 187/408 |
| 1,974,628 A | | 9/1934 | Presley | 248/32 |
| 2,175,453 A | * | 10/1939 | Barcy | 403/256 |
| 2,905,391 A | * | 9/1959 | Appleton | 238/315 |
| 4,553,872 A | | 11/1985 | Chandra et al. | 403/25 |
| 4,759,654 A | * | 7/1988 | Martin et al. | 403/387 |
| 5,022,291 A | | 6/1991 | McBain | 81/424 |
| 5,025,987 A | | 6/1991 | Kotecki et al. | 238/351 |
| 5,104,079 A | | 4/1992 | Hardtke | 248/228 |

(Continued)

FOREIGN PATENT DOCUMENTS

DE    530053    7/1931

(Continued)

OTHER PUBLICATIONS

Excerpt from catalogue *norelem Normelemente*, Markgroningen (1999); copy of Home Page, cover page, pp. 8, 90-94, 96-100, 168, and169. English language summary of cover page and remarks found on most pages of the excerpts provided.

*Primary Examiner*—Kenn Thompson
(74) *Attorney, Agent, or Firm*—Grossman Tucker Perreault & Pfleger, PLLC (57) ABSTRACT

In order to also be able to use a clamping device with structural components and girders with different dimensions or inclinations, a clamping device is proposed that comprises a tension element, to which a force can be applied, and a bearing element, which interacts with the tension element and is provided with a bearing surface that can rest against a girder or structural component. In order to ensure parallel contact of the bearing surface of the bearing element on a flange of the girder or a bearing surface of the structural component, the clamping device according to the invention further has means for coupling or connecting the tension element to the bearing element, which under the influence of the tension force or clamping force, enables the independent rotation and/or inclination of the bearing element relative to the tension element under the influence of the applied tension force, until the bearing surface of the bearing element is essentially parallel to the girder or structural component.

11 Claims, 7 Drawing Sheets

U.S. PATENT DOCUMENTS 5,451,116 A * 9/1995 Czachor et al. ............. 403/338
6,450,415 B1 * 9/2002 Kirchner et al. ............ 238/315

FOREIGN PATENT DOCUMENTS

| DE | 2245862 | 9/1972 |
| DE | 2245862 | 4/1975 |
| DE | 2626808 | 12/1976 |
| DE | 89126301 | 4/1991 |
| EP | 1158184 | 11/2001 |
| GB | 629096 | 9/1949 |
| GB | 658500 | 10/1951 |
| GB | 1122255 | 8/1968 |
| GB | 1530463 | 11/1978 |
| WO | WO 88/04736 | 6/1988 |

* cited by examiner

CLAMPING DEVICE FOR CLAMPING GIRDERS

FIELD OF THE INVENTION

The invention relates to a clamping device for the releasable connection of structural components to girders or for the releasable connection of girders to one another.

BACKGROUND

Clamping devices of this kind are used, for example, wherever the welding together of the girders is impossible or the girders must be connected in releasable fashion so that they can be reused. In principle, these girders can have any shape, such as a U-shaped, T-shaped or I-shaped cross-section. These profiles frequently have flanges with inclined surfaces, particularly on the inside surfaces. If the clamping device rests against inclined girder flanges, or inclined bearing surfaces of structural components that help connect the girders to one another, the clamping device and the girder or structural component can shift relative to one another when a clamping force or tension force is applied due to the non-parallel bearing surfaces.

In one solution to this problem, the tension element of the clamping device can be provided with an inclined surface as the bearing surface, running in the direction opposite to the inclined surface of the flange or structural component, in order to ensure parallel contact of the bearing surface of the tension element on the bearing surface of the girder or structural component. Consequently, a corresponding clamping device has to be provided for every specific bearing surface.

In another solution according to the prior art, an additional structural component is positioned between the inclined surface of the girder or structural component and the bearing surface of the tension element. For example, German patent application P 22 45 862 discloses a clamp connection for profile rails with an I-shaped or U-shaped profile with webs of different width, in which an abutting block with an inclined surface in the opposite direction is inserted between the inclined inside surface of the web of a U-rail and a clamping plate, in order to prevent the shifting of the clamping plate on the U-leg when tightening the clamp connection, this being made possible by the inclination of the U-leg. The use of such an abutting block to compensate for non-parallel bearing surfaces requires at least one additional working step when mounting these clamping devices. Moreover, there is a risk of losing the comparatively small, additional component.

Consequently, the object of the invention is to provide a clamping device which at least partially eliminates the disadvantages of the conventional clamping devices described above and, in particular, can be used with structural components and girders with different dimensions or inclinations.

The invention already solves this object with a clamping device having the characteristics described in claim 1 for the releasable connection of structural components to girders or of girders to one another.

SUMMARY

As defined in claim 1, a clamping device according to the invention comprises a tension element, to which a force can be applied, and a bearing element, which interacts with the tension element and is provided with a bearing surface that can rest against a girder or structural component. In order to ensure that the bearing surface of the bearing element rests parallel against a flange of the girder or a bearing surface of the structural component, the clamping device according to the invention further comprises means for coupling or connecting the tension element to the bearing element, which, under the influence of the tension force or clamping force, enables the independent rotation and/or inclination of the bearing element relative to the tension element under the influence of the applied force, until the bearing surface of the bearing element is essentially parallel to the girder or structural component.

The invention is based on the idea of a clamping device in which the position of the tension element relative to its associated bearing surface is designed to be variable, such that when the tension element with its associated bearing surface comes up against the object to be clamped when the tension force is applied, the bearing surface of the tension element automatically aligns itself with the bearing surface of the object to be clamped. This alignment of the bearing surfaces relative to one another enables optimum force transmission, meaning that, in particular, a shift in the position of the individual parts relative to one another when the tension force is applied is prevented. The clamping device according to the invention can thus be flexibly used for numerous, differently designed structural components and girders, where the self-adjustment of the clamping device described above ensures optimum mounting, in that the tension force is applied perpendicularly to the bearing surfaces following self-adjustment.

Advantageous configurations of the invention are described in the sub-claims.

In order to couple tension elements and bearing elements, a bearing shell and a bearing body that can be accommodated in the bearing shell may be included, where the bearing body is located in the bearing shell in rotating fashion. The bearing shell can be provided either on the tension element or on the bearing element, while the associated bearing body is then provided on the bearing element or, in the other configuration, on the tension element. The relative position of the bearing shell and bearing body can be a positive fit, although both parts must have at least one degree of freedom relative to one another.

The tension element can be adapted to the geometry of the girders and structural components to be clamped. For example, if a girder with a section resting on a structural component is to be clamped to the structural component, the tension element can of bridge-shaped design, where the bearing shell is arranged on a first end of the tension element. As a result, the first end of the tension element can, for example, be pressed against a girder flange and the second end on the structural component, so that the girder and the structural component are clamped together.

In order to ensure the automatic adjustment of the bearing contact of the tension element on both objects to be clamped, a bearing element with a bearing surface for contact to a girder or structural component can be provided adjacent to both ends of the tension element.

A particularly advantageous geometry results when a bearing shell is essentially perpendicular to the longitudinal extension of the tension element, because a larger bearing surface can thus be provided on the part to be clamped.

In principle, the bearing shell and the bearing body that interacts with it can be of any design. A particularly simple geometry to manufacture results if the bearing shell is designed to accommodate an essentially cylindrical bearing body. This further results in the existence of a single degree of freedom between the bearing shell and the bearing body accommodated by it, this being constituted by the axial rotation of the bearing body in the cylindrical bearing shell.

With a cylindrical bearing shell, in order to prevent the bearing body from moving out of the bearing shell due to the occurrence of axial forces, the bearing shell can be provided with a groove, which runs essentially perpendicular to the longitudinal extension of the bearing shell and interacts with a projection on the bearing body in order to absorb the forces running parallel to the longitudinal extension of the bearing body, where the projection can also be designed as a web. This interaction between the groove and the projection can also be used to define the degree of freedom of the bearing body in the bearing shell. It is understood that the groove can also be provided on the bearing body and the projection on the bearing shell.

However, each of the side ends of the bearing shell can also be provided with a wall section that interacts with an associated wall section of the bearing body in order to absorb the axial forces on the bearing body, so that the bearing body is held in place laterally in the bearing shell.

In order to counteract forces occurring perpendicular to the tension force, such as those caused by vibrations, the bearing surface of the bearing element can be textured or corrugated.

In order to be able to provide even greater flexibility on the various girders or structural components, a bearing element with the associated bearing surface can be rigidly connected to the tension element, where the distance between the bearing surface of the bearing element and the tension element is adjustable. This can be achieved, for example, by a bearing element comprising at least one threaded bolt, which can be screwed into a corresponding thread in the tension element, where the end surface of the threaded bolt that is farthest from the tension element acts as a bearing surface of the bearing element.

In order to create a clamping device suitable for clamping a girder flange to a plate-shaped structural component, a tension screw can extend through the tension element, where a tension force can be exerted on the top of the tension element by way of a clamping plate and nut acting on it. In order to prevent tilting of the clamping plate on the tension element, the top of the tension element can be curved in the longitudinal direction and the clamping plate can be of correspondingly curved design for full surface contact on the tension element.

With reference to the prior art described in the opening paragraphs and the associated disadvantages, the invention also relates to a clamping device for the releasable connection of structural components to girders or to the releasable connection of girders with a tension element on which a force can be exerted that can be transmitted to the girder by way of a bearing surface provided on the tension element.

As another solution, it is proposed that the bearing surface be provided with a threaded piece connected to the tension element, the surface of one side of which is at least partially set into the tension element while the opposite side essentially protrudes out of the tension element in semicylindrical fashion. The threaded piece thus forms the bearing surface of the tension element.

Because the known clamping devices slip on smooth or painted girders and do not ensure a sufficient hold for the girders, particularly in the case of shock-like loads, it is necessary for at least a slight positive fit to exist between the tension element and the girders. This positive fit is created by the thread of the threaded piece, which cuts into the surface of the girders when the tension element is tightened.

The threaded piece is preferably made of a hardened material, particularly a hardened austenitic steel, such as X46Cr13. The threaded piece usually has a length/diameter ratio of less than 10, preferably less than 5.

The connection between the wall element and the threaded piece can be made, for example, either by a snap connection, where a semicylindrical recess with an undercut which the threaded piece can snap into is preferably provided on the tension element, or by the simple gluing of the threaded piece in the semicylindrical recess of the tension element. Other suitable connection methods are also possible.

The present tension element is also preferably of bridge-shaped design and the threaded piece provided on a first end of the tension element. In the manner described above, the first end of the tension element can be pressed, for example, against a girder flange and the second end against the structural component, so that the girder and the structural component can be clamped together.

Of course, the further developments described above for adjusting the tension element can also be realised with this second solution.

BRIEF DESCRIPTION OF THE DRAWINGS

The invention is explained by describing several configurations referring to the enclosed drawings, which show the following.

DETAILED DESCRIPTION

Figure 1:
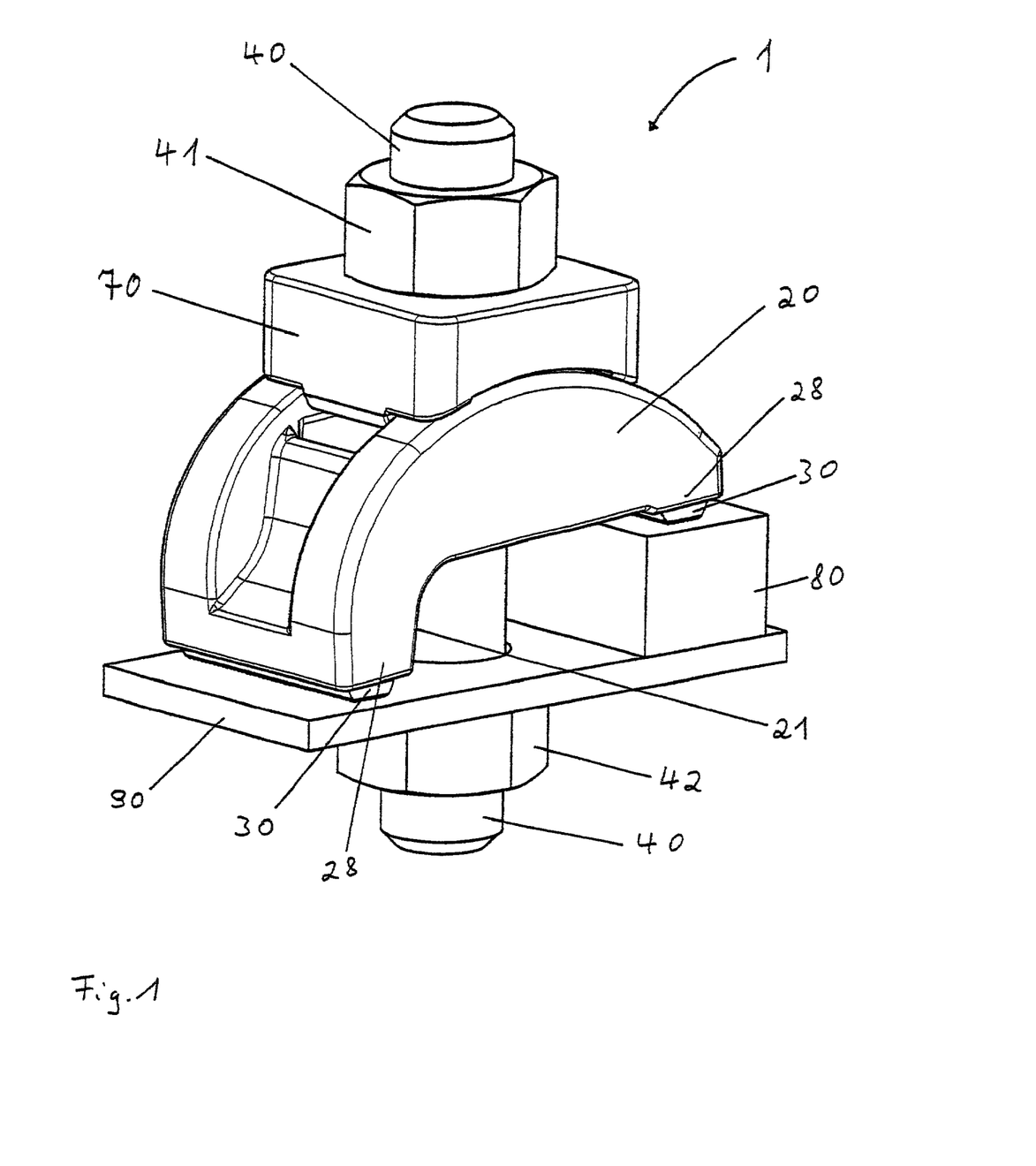
FIG. 1 Perspective view of a first configuration of a clamping device according to the invention, FIG. 2 Side view of the clamping device shown in FIG. 1, with a clamped girder flange with a horizontal underside, FIG. 3 Side view of the clamping device shown in FIG. 1, with a clamped girder flange with an inclined underside, FIGS. 4a, b Two perspective views of a tension element, FIG. 5 A cylindrical bearing element, FIGS. 6a, b Side and cross-sectional views of another cylindrical bearing element with a groove, FIG. 7 A clamping disk that interacts with the tension element shown in FIGS. 4a, b, FIG. 8 Perspective view of another configuration of a clamping device according to the invention, FIG. 9 Top view of the clamping device shown in FIG. 8, FIGS. 10a, b, c Side views of another configuration of a clamping device according to the invention at various angular positions for mounting girders of different heights, FIG. 11 Longitudinal section of the clamping device according to FIG. 10, and FIG. 12 Section along Line XII—XII in FIG. 11.

FIG. 1 shows a first configuration of clamping device 1 according to the invention, with which girder 80 is clamped to structural component 90. The clamping device essentially comprises bridge-shaped tension element 20, on both ends of which bearing elements 30 are mounted, these resting against girder 80 and structural component 90. Lateral shifting of bearing elements 30 out of the tension element is prevented by side wall sections 28 on the tension element. In order to essentially compensate for the different heights of contact on the structural component and on the girder, the tension element has foot section 21, which is located on the side on which bearing element 30 rests against structural component 90 and runs perpendicular to the longitudinal extension of the tension element. Because the position of bearing elements 30 relative to tension element 20 is not fixed, the height of the foot section of the tension element need not be exactly equal to the height of girder 80 in order to ensure flat contact between bearing element 30 and girder 80 (refer to the explanations below for details). In order to exert a tension force, bolt 40 extends roughly through the middle of the tension element, essentially perpendicular to its longitudinal extension, and through structural component 90, where nut 42 is screwed onto bolt 40 on the underside of the structural component to act as a bottom clamping plate. Clamping plate 70, which is mounted on the top end of bolt 40, presses against the tension element by means of another nut 41 that applies a tension force to clamping plate 70. Clamping plate 70 transmits the force to tension element 20, which presses the respective bearing element against structural component 90 or girder 80, this ultimately securing girder 80 and structural component 90 relative to one another.

Figure 2:
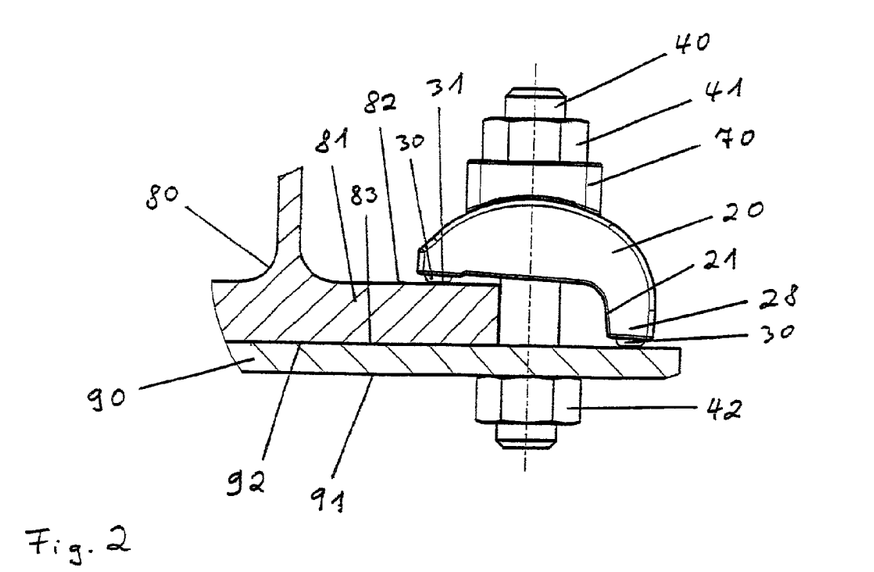

A side view of another clamping device according to the invention for clamping girder flange 81 to structural component 90 is shown in FIG. 2, where underside 82 of the girder flange is parallel to top side 83 of the girder flange, which is in full contact with top side 92 of structural component 90. Relative to tension element 20, bearing element 30, which rests directly on top side 92 of structural component 90, is slightly rotated in the bearing shell relative to bearing element 30, which rests on underside 82 of the girder flange, because bridge foot 21 does not completely compensate for the height of the girder flange.

Figure 3:
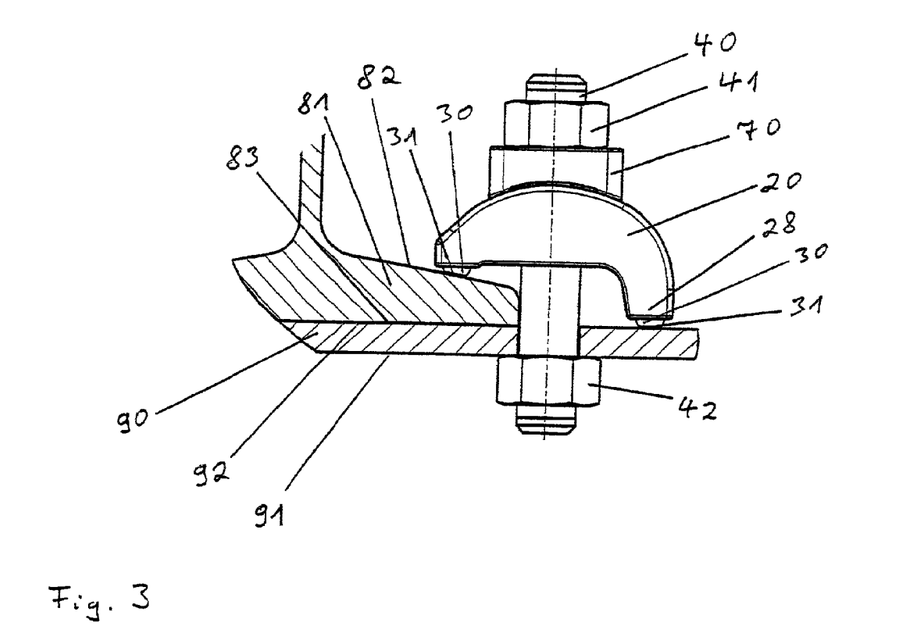

In contrast, girder flange 81, shown in a side view in FIG. 3, has an underside 82 which is not parallel to top side 83. Clamping device 1 is identical to the one shown in FIG. 2. Bearing elements 30 shown in FIG. 3 have very different orientations relative to tension element 20, because bearing element 30 (shown on the left in the figure) has rotated in the bearing shell of tension element 20 during assembly of clamping element 1 until its bearing surface 31 is in full contact with underside 82 of girder flange 81. Due to the full-surface contact of bearing element 30 on the inclined underside of the girder flange, tightening screw 41 or 42 does not generate a force component perpendicular to the axis of bolt 40, which could shift the girder flange relative to the clamping device. Because the bridge foot of the tension element in FIG. 3 just compensates for the difference in height between structural component 90 and the girder flange, the bearing element on the right is not rotated in its bearing shell. The tension elements shown in FIGS. 2 and 3 also display two side wall sections 28 in the bearing shell, which absorb transverse forces acting on the bearing elements.

Figure 4:
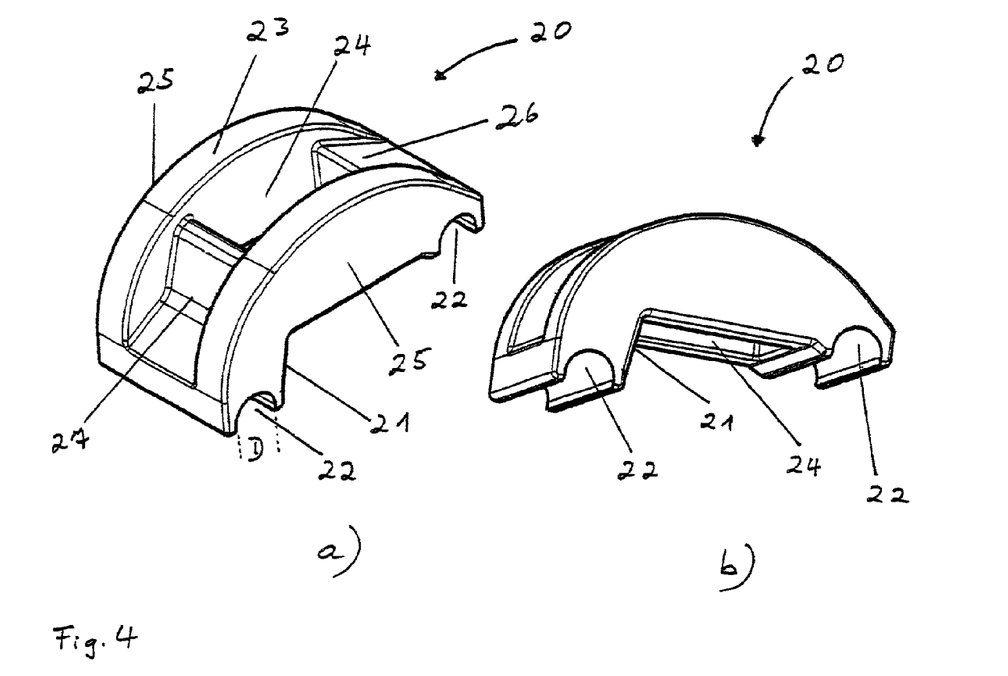

The structure of an example tension element 20 is shown in FIGS. 4a and 4b. Two bridge-shaped side elements 25 are connected to one another in the region of the bridge heads by means of webs 26, 27, in this way forming a bolt hole 24 limited by the inside surfaces of the two side elements and the webs. The top side of each side element is provided with a curved slide surface 23, on which the clamping plate described in more detail below is placed. One of the bridge heads is provided with a foot section 21 to compensate for the thickness of the girder flange held in place on the other bridge head. Laterally open bearing shell 22 is provided on both bridge heads in the transverse direction. As explained above, these lateral openings can also be closed by a side section 28 of the bearing shell. The surface of the bearing shell is cylindrical, where the width of bearing shell opening D is smaller than 2 R, where R is the radius of the cylinder shell. This means that the bearing shell has an undercut, which prevents a cylindrical bearing body shaped to match the bearing shell from falling down out of the bearing shell.

Figure 5:
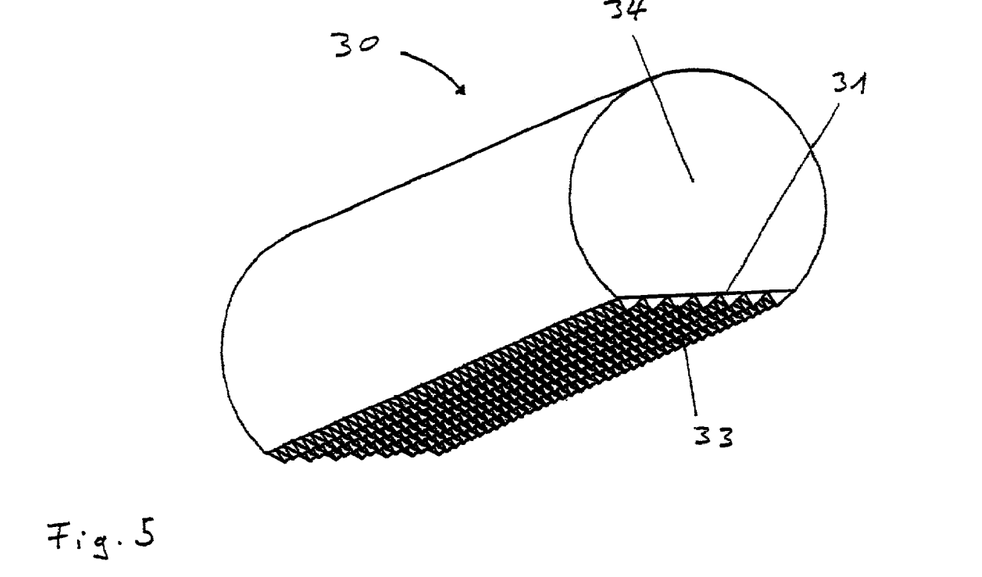

FIG. 5 shows a perspective view of bearing element 30, which is designed as a cylindrical bearing body. The cylinder has a radius equal to bearing shell R. In order to form bearing surface 31, the cylinder has a sectional plane parallel to the cylinder axis. The bearing body is designed for the tension element shown in FIGS. 1, 2 and 3. In this context, lateral surface 34 interacts with associated side section 28 of the bearing shell in order to absorb axial forces on bearing element 30. The surface of the sectional plane is corrugated, where projections 33 press into the opposite surface of the object to be clamped when the tension force is applied.

Figure 6:
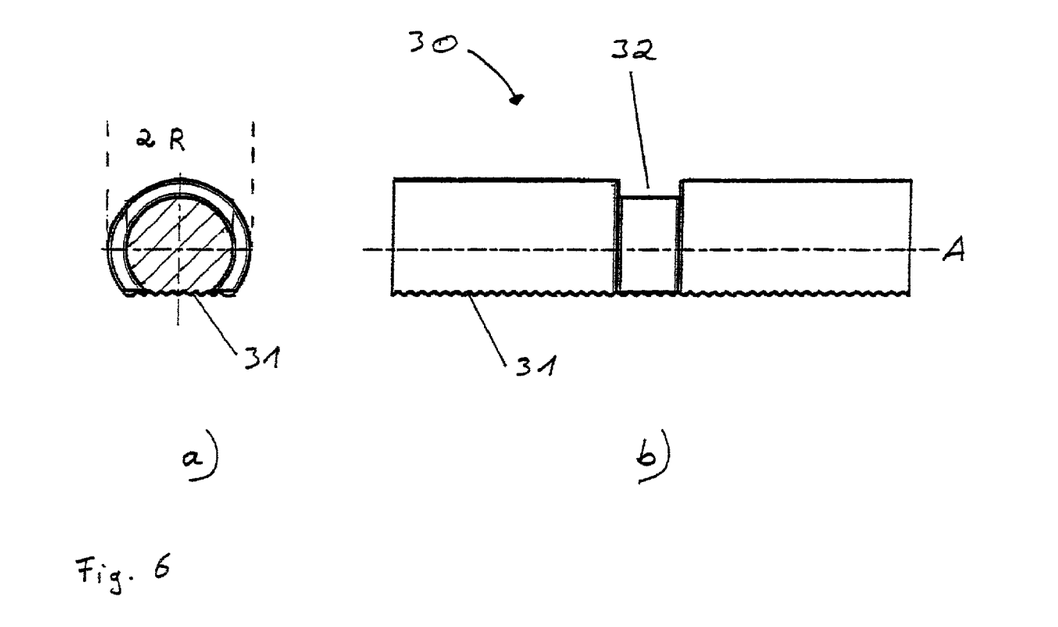

FIG. 6 shows side and cross-sectional views of an alternative configuration of bearing element 30 designed as a cylindrical bearing body, which is designed for use with a tension element as shown in FIGS. 4a, 4b. Once again, the cylinder has a radius equal to bearing shell R. The sectional plane that forms bearing surface 31 is parallel to cylinder axis A. Furthermore, bearing element 30 has a circumferential groove 32, which is positioned roughly in the middle of its longitudinal extension and interacts with a projection (not shown in FIGS. 4a, 4b) in the bearing shell. In this context, the projection engages groove 32, so that any forces occurring in the longitudinal direction of the bearing element can be absorbed and the lateral displacement of bearing element 30 out of bearing shell 22 thus prevented. Accordingly, side wall sections 28 on the tension element can be eliminated.

As a result of the undercut in bearing shell 22 explained above, which, however, is very small, the mounting element shown in FIG. 5 can be snapped into bearing shell 22 by applying slight pressure, so that it is captively connected to the tension element.

Figure 7:
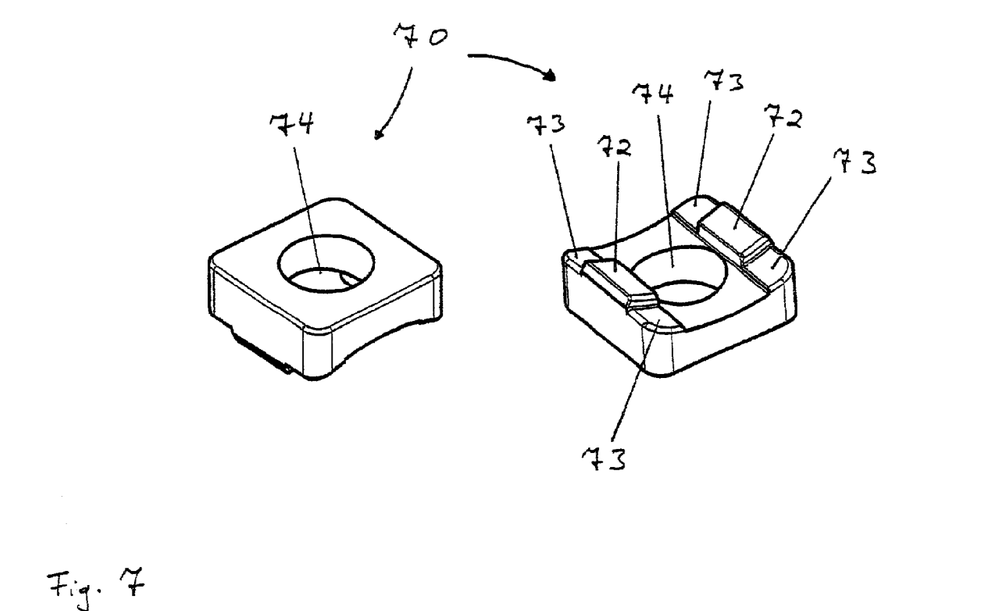

Clamping plate 70, which interacts with the tension element and the tension nut, is shown in detail in FIG. 7. It has curved slide surfaces 73 in accordance with curved surfaces 23 of the tension element. Bolt 40 of the assembled clamping element extends through bolt hole 74. Guide webs 72 on the clamping plate prevent lateral shifting of the bolt relative to the tension element. For this purpose, the guide webs interact with the inside surfaces of side elements 25 (see FIG. 1). Slide surfaces 23, 73 ensure that the clamping disk is in full contact with the tension element, even if the tension element is inclined slightly to one side due to the rotation of a bearing element in its bearing shell when tension nut 41 is tightened.

Despite a potential positive fit between tension element 20 and bearing element 30, the bearing element is mounted in bearing shell 22 in rotating fashion regardless of the specific design of the tension element and bearing element. This is of decisive importance for the functional principle of the clamping device according to the invention, which is discussed below on the basis of FIG. 3. In this context, it is assumed that, prior to assembling the clamping element, the two bearing surfaces 31 of bearing elements 30 in tension element 20 are oriented parallel to one another, where this orientation should correspond to top side 92 of structural component 90. If bearing flange 81 is arranged relative to structural component 90 as shown in FIG. 3, and threaded bolt 40 with bottom nut 42 passes through the opening in plate 90, right-hand bearing element 30 of tension element 20 can be placed on plate 90 and left-hand bearing element 30 on inclined underside 82 of girder flange 81. However, bearing surface 31 of left-hand bearing element 30 is not flat on underside 82 of the girder flange, but rather inclined relative to it. If clamping plate 70 is now placed on tension element 20 and nut 41 screwed onto bolt 40, a torque results that turns left-hand bearing element 30 clockwise until bearing surface 31 of the bearing element is parallel to underside 82 of the girder flange. A subsequent increase in the tension force due to the turning of nut 41 results in optimum clamping of girder flange 82 on structural component 90.

Figure 8:
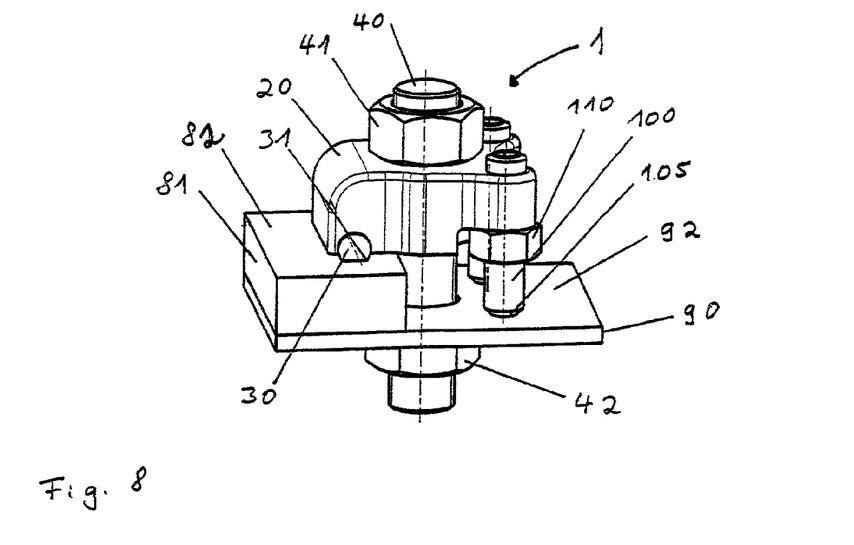
Figure 9:
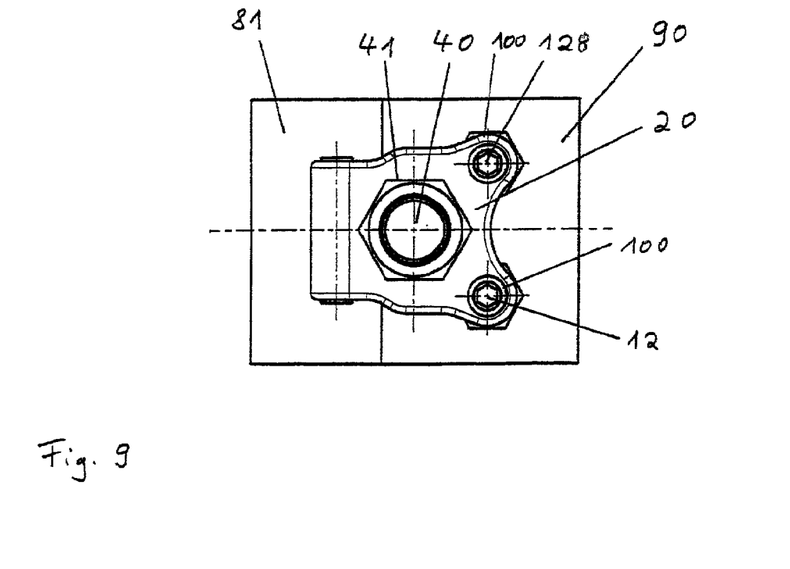

FIG. 8 shows a perspective view of another configuration of the invention. This configuration also has bolt 40 running through tension element 20 and structural component 90, where nut 42 serves as a bottom clamping plate. The bolt hole in the tension element roughly corresponds to the diameter of the bolt, so that a top clamping plate need not be used. In contrast to the previous configuration, the tension element does not rest against structural component 90 by means of a bearing element arranged in a bearing shell. Instead, two threaded bolts 100 are provided at a distance from one another, each of which can be screwed into an associated thread in the tension element and extends essentially parallel to threaded tension bolt 40 up to top side 92 of structural component 90. End faces 105 of bolts 100 facing structural component 90 thus replace bearing surface 31 of the right-hand bearing element, e.g. shown in FIG. 2. On the top side (see FIG. 9), a tool can be inserted in a hexagonal recess 128, with which threaded bolts 100 can be further screwed into tension element 20 or unscrewed, this making it possible to adjust the distance of tension element 20 from structural component 90. The distance set between tension element 20 and structural component 90 is secured with nuts 110, which can be turned against the underside of the tension element. Because the orientation of bearing surface 31 of bearing element 30 automatically adapts to underside 82 of the girder flange, bolts 100 need not be set precisely in order to define the distance of tension element 20 from structural component 90. Bearing element 30 is arranged relative to threaded bolts 100, such that its longitudinal extension is essentially parallel to an imaginary line connecting bolts 100, where the hole in the tension element for threaded bolt 40 is formed between the connecting line and bearing element 30.

Figure 10A:
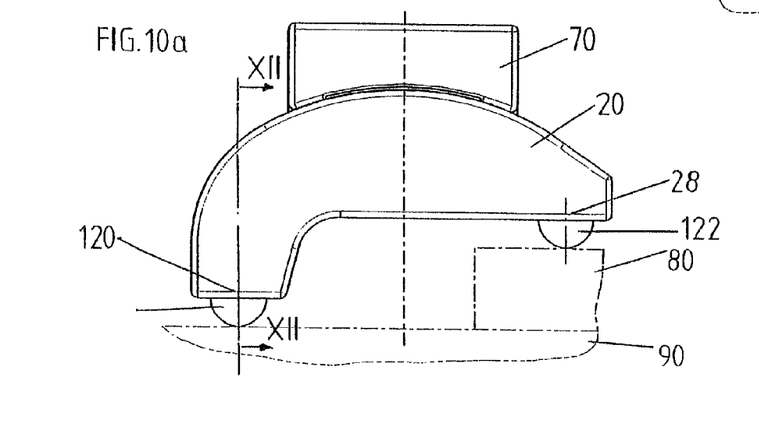
Figure 10B:
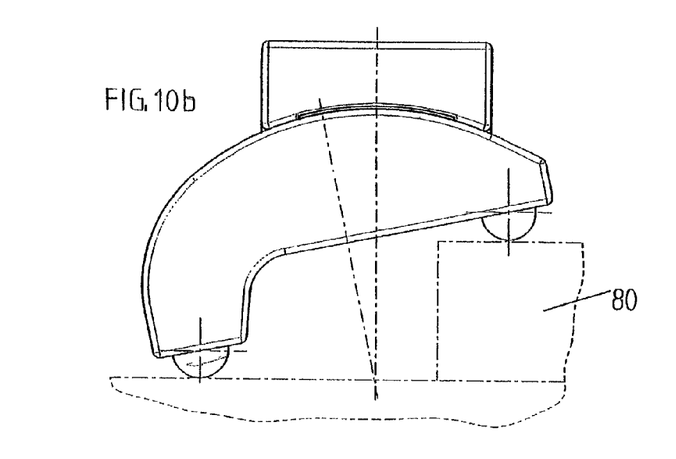
Figure 10C:
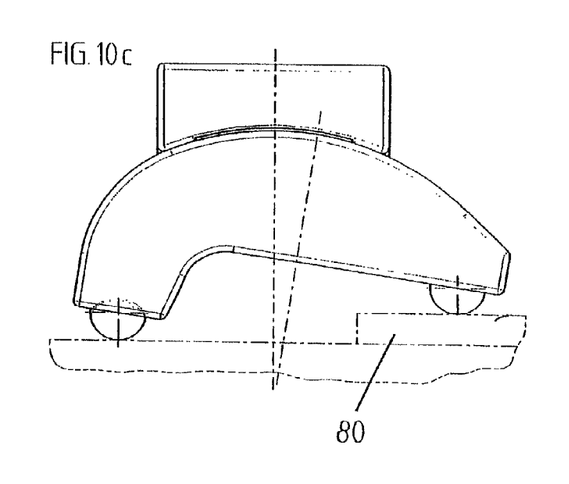
Figure 11:
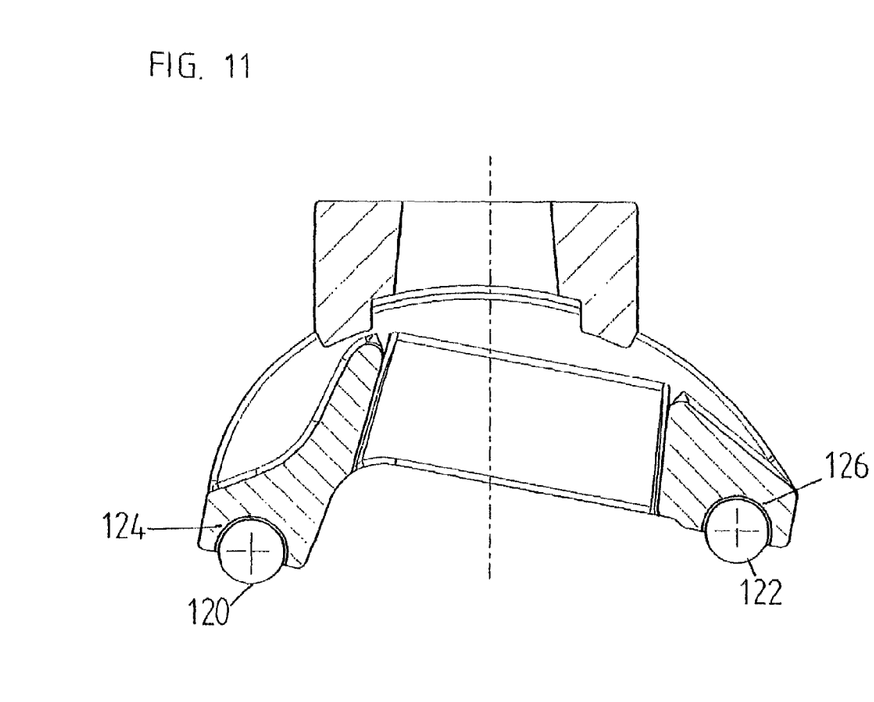
Figure 12:
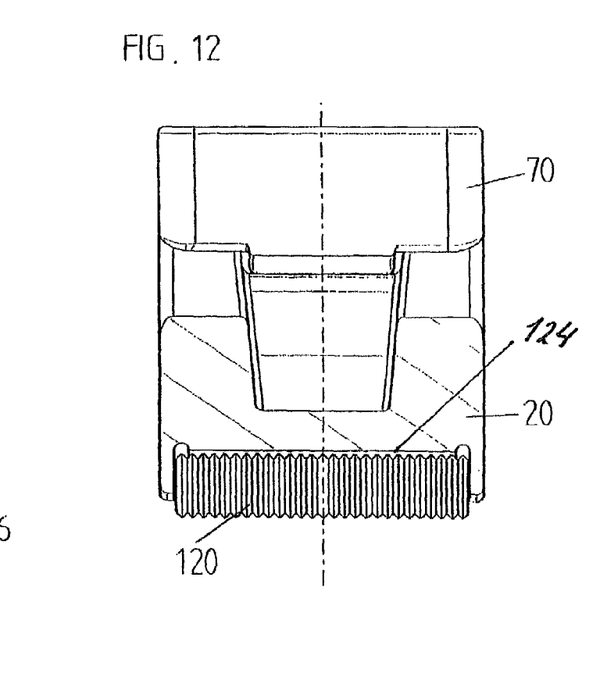

FIGS. 10 to 12 show an alternative configuration of the tension element according to the invention, which also functions according to the ball-and-socket principle for adjusting the relative position of the tension element. Matching components are denoted by the same reference numbers.

This configuration also comprises tension element 20, which can be pressed by means of clamping plate 70 against a girder, structural component 90 or the like. Bolt 40 (not shown) generates the clamping force. In contrast to the previous configurations, however, simple cylindrical threaded pieces 120, 122 are inserted in semicylindrical recesses 124, 126 of tension element 20, instead of the bearing elements mounted in rotating fashion in tension element 20. Semicylindrical recesses 124, 126 essentially extend perpendicular to the longitudinal direction of tension element 20 and are provided on the ends, i.e. in foot section 21 and side wall section 28.

In the present configuration, threaded pieces 120, 122 are glued into recesses 124, 126. Because the section of threaded pieces 120, 122 projecting out of tension element 20 is in the shape of a semicylinder, the threaded pieces need not be mounted in tension element 20 in rotating fashion like the bearing elements in the configurations described above. Nevertheless, the spherical surfaces of threaded pieces 120, 122 allow the desired angular position of tension element 20 to be set relative to clamping plate 70. As a result, differences in the height of the contact surfaces on structural component 80 or girder 90 can be compensated for as necessary (see FIGS. 10a to 10c).

The positive fit required for fixing in place is provided by the thread of threaded pieces 120, 122, which cut into the surfaces of structural component 80 or girder 90 due to the applied pressure. The textured surface is decisive for creating a positive fit. Consequently, this component need not necessarily be a threaded piece. Rather, other geometries with a corresponding surface texture can be used to realise angular adjustment. Moreover, it is possible to integrally mould the preferably semicylindrical bearing surfaces on tension element 20, which are provided with a suitable surface texture for creating the positive fit. However, a threaded piece offers a particularly attractive configuration in economic terms, because then the entire tension element 20 need not be hardened and, depending on the application, any threaded pieces can be used.

| | List of reference numbers |
|---|---|
| 1 | Clamping device |
| 20 | Tension element |
| 21 | Foot section |
| 22 | Bearing shell |
| 23 | Slide surface |
| 24 | Bolt hole |
| 25 | Side element |
| 26, 27 | Web |
| 28 | Side wall section |
| 30 | Bearing element |
| 31 | Bearing surface |
| 32 | Nut |
| 33 | Projection |
| 34 | Lateral surface |
| 40 | Bolt |
| 41, 42 | Nut |
| 70 | Clamping plate |
| 72 | Guide web |
| 73 | Slide surface |
| 74 | Bolt hole |
| 80 | Girder |
| 81 | Girder flange |
| 82 | Underside of the girder flange |
| 83 | Top side of the girder flange |
| 90 | Structural component |
| 91 | Underside of the structural component |
| 92 | Top side of the structural component |
| 100 | Bolt |
| 105 | End face |
| 110 | Nut |
| 120 | Threaded piece |
| 122 | Threaded piece |
| 124 | Recess |
| 126 | Recess |
| 128 | Hexagonal recess |
| R | Radius |
| D | Bearing shell opening |
| A | Cylinder axis |

What is claimed is:

1. Clamping device for the releasable connection of structural components to girders or for the releasable connection of girders to one another, with a tension element, on which a force can be exerted that can be transmitted to a structural component or girder by way of a bearing surface provided on the tension element, characterized in that the bearing surface is provided with a threaded piece connected to the tension element, wherein a thread of said threaded piece at least partially forms said bearing surface, and said threaded piece contacts said structural component or girder.

2. Clamping device according to claim 1, characterized in that the tension element is of bridge-shaped design and the threaded piece is provided on a first end of the tension element.

3. Clamping device according to claim 1, characterized in that a threaded piece for contact on a girder or a structural component is provided adjacent to both ends of the tension element.

4. Clamping device according to claim 1, characterized by an essentially semicylindrical recess with an undercut, into which the threaded piece can be inserted.

5. Clamping device according to claim 1, characterized by a side wall section of the bearing surface that interacts with an associated wall section on a lateral surface of a bearing body in order to absorb axial forces on the bearing body.

6. Clamping device according to claim 1, characterized in that the threaded piece is essentially perpendicular to the longitudinal extension of the tension element.

7. Clamping device according to claim 1, characterized in that the threaded piece is glued into the tension element.

8. Clamping device according to claim 1, characterized by a tension screw, which extends through the tension element between its ends and exerts a forced on the top of the tension element.

9. Clamping device according to claim 8, characterized by at least one threaded bolt, which can be screwed into a corresponding thread in the tension element and is essentially parallel to the tension screw, where the bearing surface is an end surface of the threaded bolt.

10. Clamping device according to claim 8, characterized in that the tension element is formed by two side elements, which are connected on their ends, parallel to one another and curved on the top, where a hole for the tension screw is formed between the ends.

11. Clamping device according to claim 10, characterized by a clamping plate, through which the tension screw extends and which is of curved design in order to rest on the top side of the two side elements, where the tension screw exerts a force on the clamping plate by means of a nut.

* * * * *